(12) United States Patent
Farrell

(10) Patent No.: US 7,246,698 B2
(45) Date of Patent: Jul. 24, 2007

(54) ENDLESS CONVEYOR BELT AND SPLICING MEMBER FOR FORMING SAME

(75) Inventor: Glenn Peter Farrell, Landisville, PA (US)

(73) Assignee: Lumsden Flexx Flow, Inc., Lancaster, PA (US)

( * ) Notice: Subject to any disclaimer, the term of this patent is extended or adjusted under 35 U.S.C. 154(b) by 105 days.

(21) Appl. No.: 11/135,273

(22) Filed: May 24, 2005

(65) Prior Publication Data

US 2006/0266626 A1 Nov. 30, 2006

(51) Int. Cl.
*B65G 15/54* (2006.01)
(52) U.S. Cl. ...................................... 198/848
(58) Field of Classification Search ................. 198/848
See application file for complete search history.

(56) References Cited

U.S. PATENT DOCUMENTS

| | | | |
|---|---|---|---|
| 2,633,228 A | | 3/1953 | Potts |
| 2,904,165 A | | 9/1959 | Cook |
| 3,339,712 A | | 9/1967 | Anderson |
| 4,754,871 A | | 7/1988 | Gustafson |
| 5,404,998 A | | 4/1995 | Frye |
| 5,590,755 A | * | 1/1997 | Daringer et al. ............ 198/778 |
| 6,102,196 A | | 8/2000 | Domit |
| 6,615,978 B1 | | 9/2003 | Farrell |

OTHER PUBLICATIONS

"Wire Belt presents: C-cure edge", Feb. 2004.*
"Splicing the Flexx Flow Belt," Lumsden Corporation, published more than one year prior to filing date of subject patent application.
"Lumsden Flexx Flow Inc., Technical Guidline Brochure," pp. 1 to 7, published more than one year prior to filing date of subject patent application.
"Wire Belt Company of America Presents: Amazing Stories, The Man of Stainless Steel knows," Wire Belt Company of America, 2004.
"Special Flat-Flex® Wire Belts for Continuous Processing" undated.
E-mail dated Aug. 12, 2005 from David Greer to Glenn Farrell.
E-mail dated Aug. 17, 2005 from Glenn Farrell to David Greer.
E-mail dated Aug. 17, 2005 from David Greer to Glenn Farrell.
E-mail dated Aug. 22, 2005 from David Greer to Glenn Farrell.
E-mail dated Oct. 21, 2005 from Glenn Farrell to David Greer.

* cited by examiner

*Primary Examiner*—Mark A. Deuble
(74) *Attorney, Agent, or Firm*—Merek, Blackmon & Voorhees, LLC

(57) ABSTRACT

A conveyor belt including a plurality of interconnected wire segments forming a conveying surface to convey at least one article from one point to another. The conveying surface has first and second outermost edges. Preferably, each of the plurality of wire segments has open end regions permitting interlocking of adjacent wire elements without subsequent forming or reforming of the end regions. The outermost edges of the conveyor belt are formed to reduce the likelihood of snagging and/or injury.

19 Claims, 4 Drawing Sheets

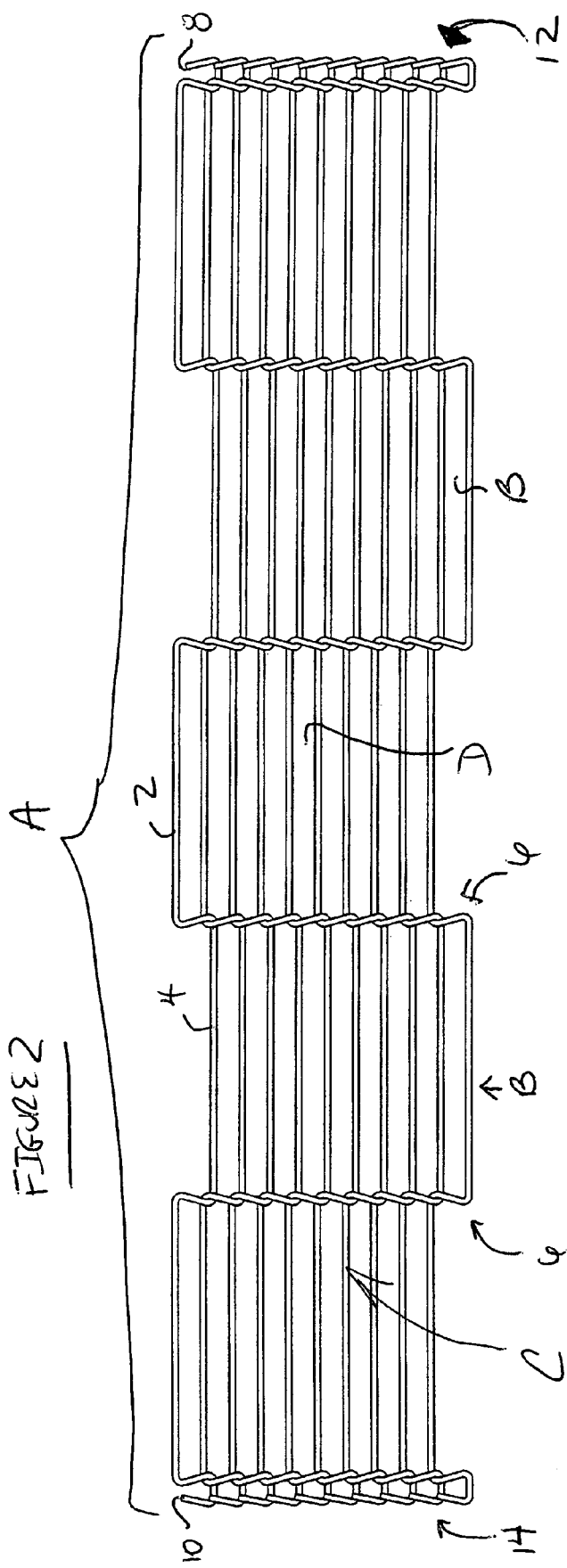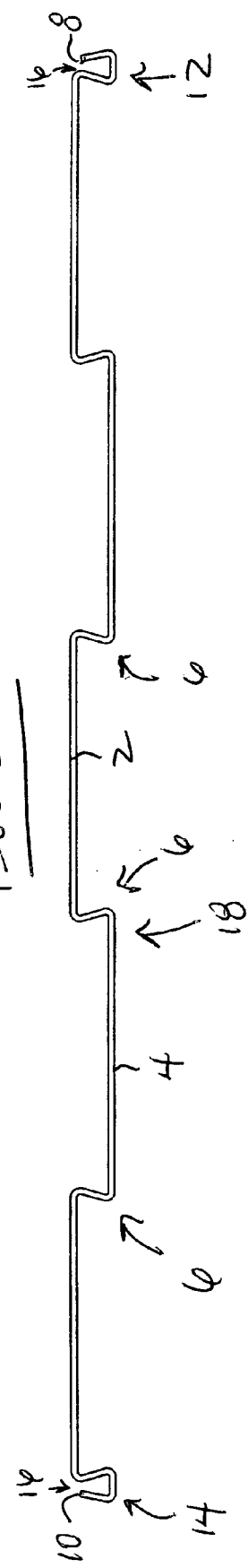

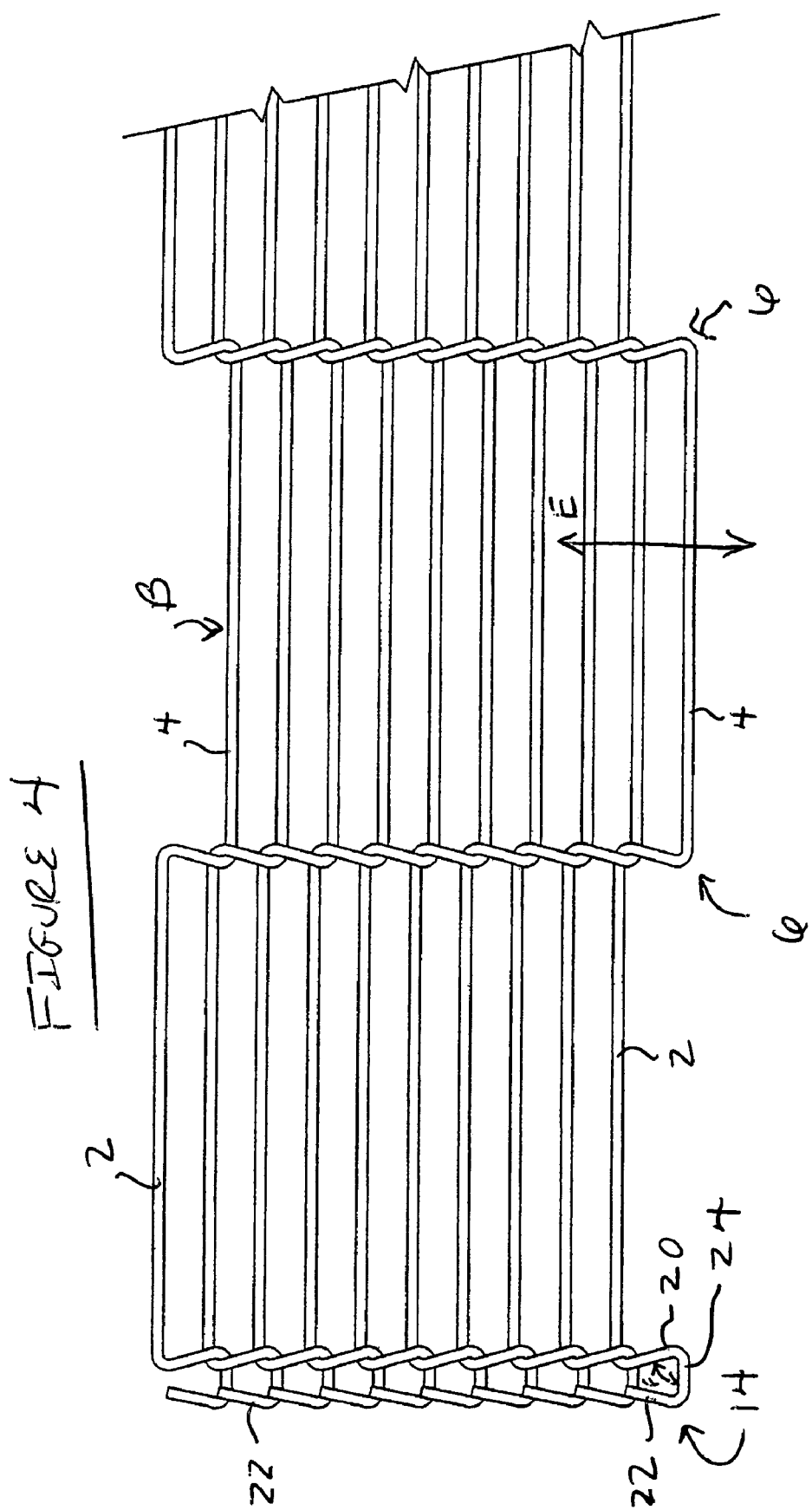

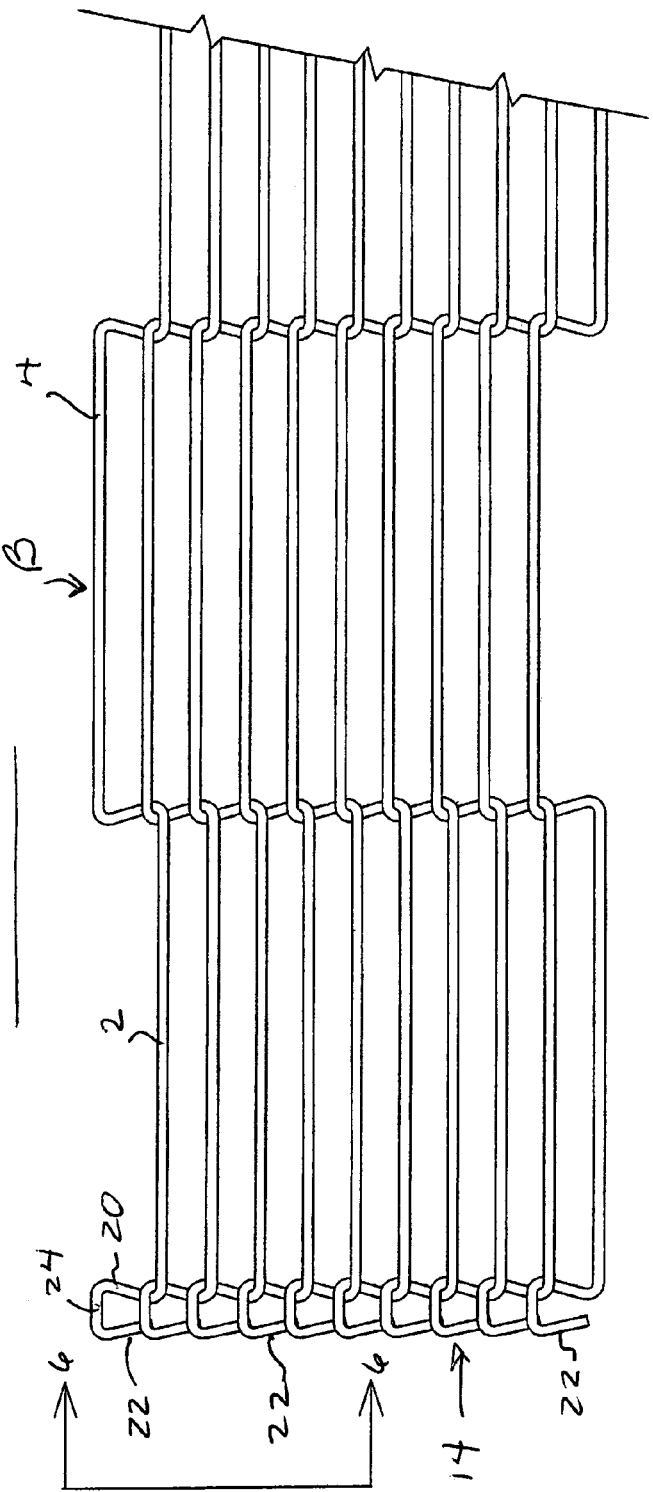

ENDLESS CONVEYOR BELT AND SPLICING MEMBER FOR FORMING SAME

FIELD OF THE INVENTION

The present invention is directed to devices used to convey objects from one location to another. In its most preferred form, the present invention is directed to an endless conveyor belt and a splicing member for forming the endless conveyor belt.

BACKGROUND OF THE INVENTION

Endless conveyor belts have been widely used to transport a number of different objects from one location to another. For example, endless conveyor belts have been used in the food processing industry to transport food products such as poultry, seafood, vegetables, cookies, crackers, bagels, tortillas and red meat. Typical food processes in which endless conveyor belts have been used include breading, battering, forming, frying, cooking, coating and baking. Endless conveyor belts have also been used in the food service industry to transport food products such as pizza, seafood, lunchmeat and toast. Endless conveyor belts can be found in this industry in impingement ovens in retail outlets, retail toasters and meat slicing systems to name a few. Further, endless conveyor belts have been used to transport confectionary food products including chocolate coatings and sugar coatings. Endless conveyor belts have also been used in the automotive industry, textile industry and electronics industry to transport various objects from one location to another.

One prior art endless conveyor belt that has been used in a wide variety of applications is the FLEXX FLOW endless belt manufactured by Lumsden Flexx Flow, Inc. While the FLEXX FLOW endless conveyor belt has been widely accepted by a number of different industries, it has some drawbacks as explained in detail hereinafter. The FLEXX FLOW endless conveyor belt includes a plurality of interconnected wire segments that form a conveying surface to transport various objects from one location to another. The conveying surface has first and second outermost edges. These outermost edges are not continuous. Rather, a gap or space is formed between the ends of a wire segment and the end regions of an interconnected wire segment as viewed from the plan view perspective. These gaps or spaces enhance the chances of the conveyor belt snagging on itself or other articles including but not limited to other conveyor belts. Snagging is undesirable as it can result in damage to the conveyor belt or other articles. Further, snagging can cause unnecessary delay in assembling the belt. Further, these spaces or gaps readily expose any burrs or jagged edges on the ends of the wire segments thereby increasing the likelihood of injury when the belt is assembled or operated. An example of this type of conveyor belt, i.e., a non-continuous edge type conveyor belt is disclosed in FIG. 1 of U.S. Pat. No. 5,404,998.

Further prior art conveyor belts are disclosed in FIGS. 2 through 6 of U.S. Pat. No. 5,404,998. These conveyor belts have significant disadvantages. Specifically, these conveyor belts are all designed such that the ends of the wire strands are formed after interlocking. These designs lead to unnecessary delays in assembling the conveyor belt. Further, the conveyor belt can become damaged or weakened during this process.

OBJECTS AND SUMMARY OF THE INVENTION

An object of the preferred embodiment of the present invention is to provide a novel and unobvious conveyor belt and splicing member for forming the conveyor belt.

Another object of the present invention is to provide a conveyor belt that overcomes the disadvantages of previously known conveyor belts.

A further object of a preferred embodiment of the present invention is to provide an endless conveyor belt that can be readily formed in the field.

Yet another object of a preferred embodiment of the present invention is to provide a conveyor belt with a plurality of wire segments that have preformed open end regions permitting interlocking of adjacent wire segments without forming or reforming the end regions of the wire segment subsequent to interlocking the adjacent wire segments.

Still a further object of a preferred embodiment of the present invention is to provide an endless conveyor belt that can be used for prolonged periods of time without the structural integrity of the conveyor becoming compromised.

Yet still a further object of a preferred embodiment of the present invention is to provide a splicing member with preformed open end regions that need not be reconfigured to interlock one end of the conveyor belt to the other end of the conveyor belt.

Another object of a preferred embodiment of the present invention is to provide a conveyor belt that reduces the likelihood of snagging and/or injury.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to a conveyor belt including a plurality of wire segments interconnected to form a conveying surface to convey at least one article from one point to another. The conveying surface has first and second outermost edges. Each of the plurality of wire segments has a first end, a first open end region, a second end and a second open end region and at least one span disposed between said first open end region and said second open end region. The first open end region of one of the plurality of wire segments is disposed relative to the first open end region of an adjacent wire segment such that the first open end region of the one of the plurality of wire segments closes the first open end region of the adjacent wire segment.

Another embodiment of the present invention is directed to a conveyor belt including a plurality of wire segments interconnected to form a conveying surface to convey at least one article from one point to another. Each of the plurality of wire segments has at least one z-bend forming upper and lower spans. The upper span is offset from the lower span relative to the direction of travel of the conveying surface. Each of the plurality of wire segments further has a first diameter, a first end, a first end region, a second end and a second end region. The first end region is formed adjacent the first end of a corresponding wire segment. The second end region is formed adjacent the second end of a corresponding wire segment. Each of the first ends are spaced from a remaining portion of a corresponding wire segment a distance at least equal to the first diameter thereby forming a gap in each of the first end regions having a width at least equal to the first diameter. The first end regions each have a leg member forming a portion of an outermost edge of the conveying surface. The leg member of one of the plurality of wire segments overlaps a first end region of a wire segment interconnected to the one of the plurality of wire segments.

A further embodiment of the present invention is directed to a conveyor belt including a plurality of wire segments interconnected to form a conveying surface to convey at least one article from one point to another. The conveying surface has first and second outermost edges. Each of the plurality of wire segments has at least one z-bend forming upper and lower spans. The upper span is offset from the lower span relative to the direction of travel of the conveying surface. Each of the plurality of wire segments further has a first diameter, a first end, a first end region, a second end and a second end region. Each of the first end regions of the plurality of wire segments being open end regions. The first open end regions each have an edge member forming a portion of the first outermost edge of the conveying surface. Each of the edge members of the first open end regions of the plurality of wire segments is disposed such that the first outermost edge is continuous.

BRIEF DESCRIPTION OF THE DRAWINGS

FIG. 2 is a bottom view of a portion of an endless conveyor belt formed in accordance with the most preferred embodiment of the present invention.

FIG. 3 is a plan view of a splicing member formed in accordance with the most preferred embodiment of the present invention.

FIG. 4 is an enlarged fragmentary bottom view of a portion of an endless conveyor belt formed in accordance with the most preferred embodiment of the present invention.

FIG. 5 is an enlarged fragmentary plan view of a portion of an endless conveyor belt formed in accordance with the most preferred embodiment of the present invention.

FIG. 6 is an enlarged side view, as seen in the directions of arrows 6—6, of a portion of an endless conveyor belt formed in accordance with the most preferred embodiment of the present invention.

DETAILED DESCRIPTION OF THE PREFERRED EMBODIMENT OF THE INVENTION

Figure 1:
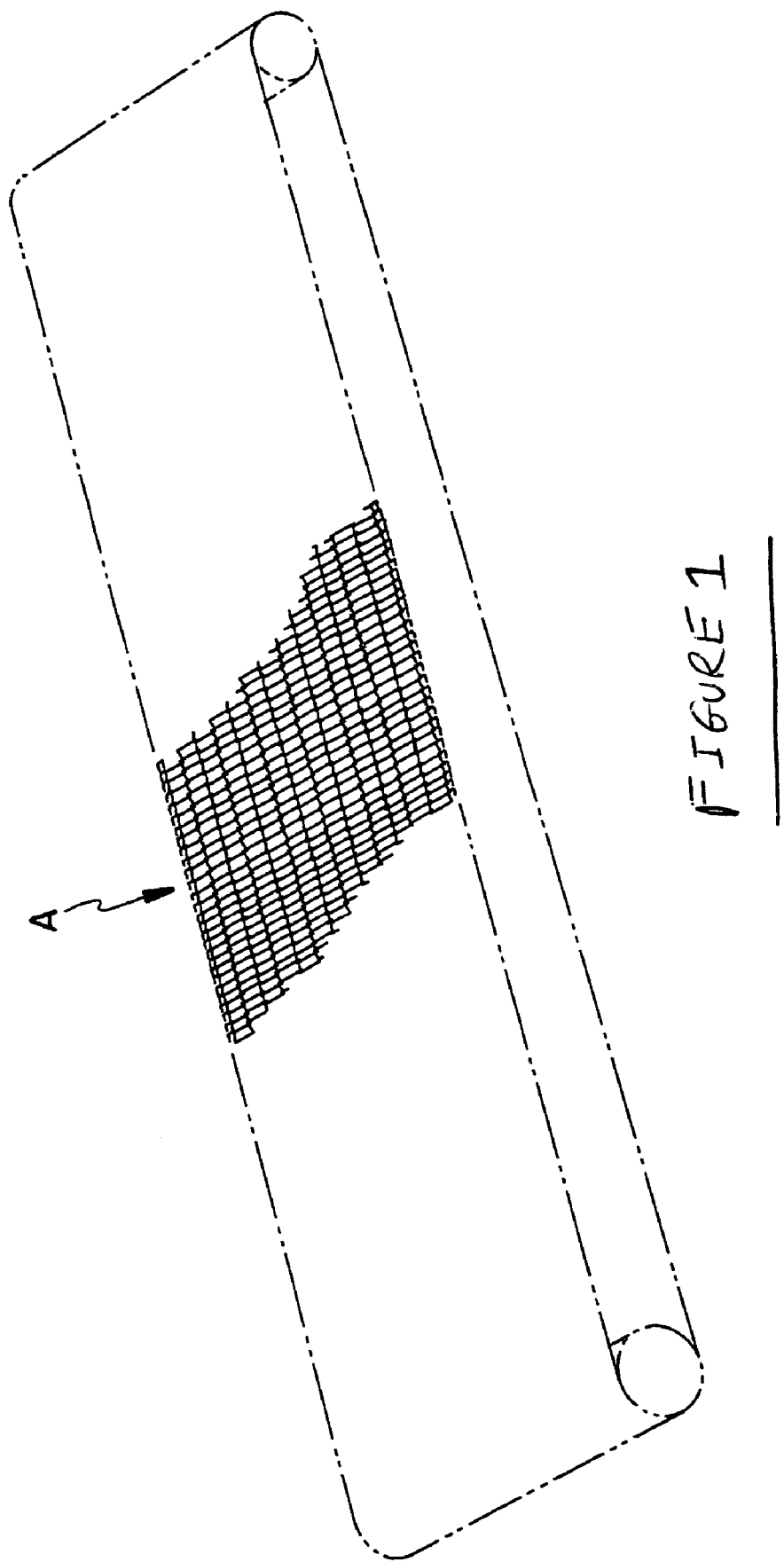
FIG. 1 is a fragmentary perspective view of one of many possible configurations for an endless conveyor belt.

The most preferred form of the invention will now be described with reference to FIGS. 1–6. The appended claims are not limited to the most preferred embodiment and no term and/or phrase used herein is to be given a meaning other than its ordinary meaning unless accompanied by a statement that the term and/or phrase "as used herein is defined as follows". The phrase "open end regions" as used herein is defined as follows: an end region of a wire segment that has a gap or space at least equal to the diameter of an adjacent wire segment permitting but not requiring the wire segments to be interconnected subsequent to formation of the end region without altering the configuration of the end region. By way of example only, it is noted that the end regions depicted in FIGS. 4A, 4B, 5 and 6 of U.S. Pat. No. 5,404,998 are not open end regions. The term "continuous" as used herein is defined as follows: free from a gap or space when viewed from a plan view perspective.

FIGS. 1 THROUGH 5

Referring to FIG. 1, an endless belt A is illustrated in one of many possible configurations. The details of the endless belt A are shown in FIGS. 2 to 6. Referring to FIG. 2, the endless belt A includes a plurality of interconnected wire segments B forming a conveying surface C for conveying an object or article from one point to another. Preferably, wire segments B have a substantially circular cross-section. However, it will be readily appreciated that the shape of the cross-section of wire segment B may be varied as desired.

Conveying surface C includes a plurality of openings D. The size of openings D will vary with the pitch and diameter of the wire segments B. Frequently used pitch and diameter dimensions for wire segments B include the following: (1) ⅛"×0.050"; (2) ¼"×0.050"; (3) ⅜"×0.050"; (4) ⅜"×0.062"; (5) ⅜"×0.082"; (6) ½"×0.072"; and, (7) ½"×0.092". However, it will be readily understood that the dimensions for pitch and diameter of wire segments B can be readily varied to suit the particular application.

Preferably, the wire segments B include a plurality of lower spans 2, a plurality of upper spans 4 and z-bends 6. The lower spans 2 and upper spans 4 extend perpendicular to the direction of travel represented by arrows E of the conveying surface C. The wire segments B further include a first end 8 and a second end 10. The wire segments B further include a first open end region 12 and a second open end region 14. Regions 12 and 14 are preferably formed as substantially U-shaped elements. Ends 8 and 10 of wire segments B are disposed from the remaining portion of the wire segment B a distance equal to or greater than the diameter of the wire segments B thereby creating gaps or spaces 16 having a width equal to or greater than the diameter of the wire segments B. This configuration allows adjoining wire segments to be interlocked after the first and second open end regions 12 and 14 are formed without the need for altering the configurations of end regions 12 and 14. This is particularly useful when joining one end of the conveyor belt A to the other end with splicing wire segment 18 illustrated in FIG. 3. Preferably, splicing wire segment 18 has the same configuration as the other wire segments B of the conveyor belt A. However, it will be readily appreciated that the configuration of the splicing wire segment may be varied as desired.

The wire segments B are preferably formed from high tensile 302 stainless steel wire. However, it will be readily appreciated that the configuration and material of the wire segments B may be varied.

Referring to FIGS. 2 and 4 through 6, the specifics of the ends regions of the wire segments B and the outermost edges of the conveyor belt A will be described. As seen in FIG. 2, the open end regions 12 and 14 are similar in configuration. Accordingly, only one open end region will be described in detail. Open end regions 12 include an inner leg member 20, an outer leg member 22 and an end span 24 connecting the inner leg member 20 to the outer leg member 22. End span 24 shares a common longitudinal axis with the upper spans 4 of a given wire segment B. Spans 2, 4 and 24 extend perpendicular to the direction of travel E of conveyor surface C. Inner leg member 20 and outer leg member 22 extend at an angle to the common longitudinal axis of end span 24 and upper spans 4 of the wire segment B.

The outer leg member 22 is angled inwardly toward the center of the conveying surface C. This angle, i.e., the angle between outer leg member 22 and the longitudinal axis of span 24, is represented by reference letter F, as seen in FIG. 4. Preferably, angle F ranges from approximately 70 degrees to approximately 86 degrees depending on the pitch and diameter of wire segment B. Most preferably, the relationship between angle F and the pitch and diameter of wire segments B is as follows: 77 degrees for ⅜ inches by 0.050 inches wire segment; 76 degrees for ⅜ inches by 0.062 inches wire segment; 84 degrees for ⅜ inches by 0.082 inches wire segment; 83 degrees for ½ inches by 0.072 inches wire segment; and, 75 degrees for ½ inches by 0.092 inches wire segment However, it will be readily appreciated that angle F may be varied as desired. By angling the outer leg member 22 inwardly, the end of the wire segment B is hidden. This reduces the likelihood that any burr or other irregularity formed on the end of the wire segment will injury an individual and/or damage articles that come into contact with the edge of the conveyor belt A. The ends of the wire segment B may also be buffed to further reduce the likelihood that any burr or other irregularity on the end of the wire segment B will injury an individual and/or damage articles that come into contact with the edge of the conveyor belt A.

As seen in FIG. 5, the outer leg members 22 form a continuous outermost edge 26. As seen in FIG. 6, the outer leg member 22 extends downwardly from the conveying surface C forming an angle G with plane H. This orientation of the outer leg member 22 allows the outer leg member to overlap the adjacent open end region. Plane H extending through conveying surface C is substantially parallel to Plane I. Angle J formed by outer leg member 22 and Plane I is equal to angle G. Angles G and J preferably range from approximately 10 degrees to approximately 22 degrees depending on the diameter and pitch of the wire segments B. Most preferably, the relationship between angles G and J and the pitch and diameter of wire segments B is as follows: 14 degrees for ⅜ inches by 0.050 inches wire segment; 15 degrees for ⅜ inches by 0.062 inches wire segment; 20 degrees for ⅜ inches by 0.082 inches wire segment; 12 degrees for ½ inches by 0.072 inches wire segment; and, 18 degrees for ½ inches by 0.092 inches wire segment However, it will be readily appreciated that this angle may be varied as desired.

As seen in FIGS. 2, 4 and 5, the open end regions on a given side of the conveyor belt are oriented relative to each other such that the one open end region of a wire segment closes the gap formed in the open end region of an adjacent wire segment. This orientation reduces the likelihood that the conveyor belt A will snag on itself or other objects. The orientation of the open end regions of the preferred embodiment of the present invention is in sharp contrast to the spaced orientation of the end regions illustrated in FIG. 1 of U.S. Pat. No. 5,404,998. Spaced orientations similar to that of FIG. 1 of U.S. Pat. No. 5,404,998 are highly susceptible to snagging. The present invention permits interlocking of adjacent wire segments having preformed end regions while simultaneously reducing the likelihood of snagging. Accordingly, wire segments of the preferred embodiment of the present invention are less likely to be damaged or weakened. Further, the endless conveyor belt can be more readily assembled.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

I claim:

1. A conveyor belt, comprising:
  (a) a plurality of wire segments, said plurality of wire segments being interconnected to form a conveying surface to convey at least one article from one point to another, said conveying surface having first and second outermost edges, said plurality of wire segments each having the same configuration;
  (b) each of said plurality of wire segments having a first diameter, a first end, a first open end region, a second end and a second open end region and at least one span disposed between said first open end region and said second open end region, each of said first ends being spaced from a remaining portion of a corresponding wire segment a distance at least equal to said first diameter thereby forming a gap in each of said first end regions having a width at least equal to said first diameter; and,
  (c) said first open end region of one of said plurality of wire segments being disposed relative to said first open end region of an adjacent wire segment such that said first open end region of said one of said plurality of wire segments closes said first open end region of said adjacent wire segment.

2. A conveyor belt as recited in claim 1, wherein:
  (a) said second open end region of one of said plurality of wire segments is disposed relative to said second open end region of an adjacent wire segment such that said second open end region of said one of said plurality of wire segments closes said second open end region of said adjacent wire segment.

3. A conveyor belt as recited in claim 2, wherein:
  (a) said first end regions of said plurality of wire segments each have a leg member forming a portion of an outermost edge of said conveying surface, at least a portion of said leg member of a first end region of one of said plurality of wire segments overlaps a first end region of a wire segment interconnected to said one of said plurality of wire segments.

4. A conveyor belt as recited in claim 3, wherein:
  (a) said second end regions of said plurality of wire segments each have a leg member forming a portion of an outermost edge of said conveying surface, at least a portion of said leg member of a second end region of one of said plurality of wire segments overlaps a second end region of a wire segment interconnected to said one of said plurality of wire segments.

5. A conveyor belt as set forth in claim 3, wherein:
  (a) said leg member of each of said first open end regions extends at a first angle downwardly from said conveying surface, said first angle is less than 90 degrees and greater than 0 degrees.

6. A conveyor belt as set forth in claim 4, wherein:
  (a) said leg member of each of said second open end regions extends at a first angle downwardly from said conveying surface, said first angle is less than 90 degrees and greater than 0 degrees.

7. A conveyor belt as recited in claim 1, wherein:
  (a) said first end regions are substantially U-shaped.

8. A conveyor belt as recited in claim 1, wherein:
  (a) said second end regions are substantially U-shaped.

9. A conveyor belt, comprising:
(a) a plurality of wire segments, said plurality of wire segments being interconnected to form a conveying surface to convey at least one article from one point to another;
(b) each of said plurality of wire segments having at least one z-bend forming upper and lower spans, said upper span being offset from said lower span relative to a direction of travel of said conveying surface, each of said plurality of wire segments further having a first diameter, a first end, a first end region, a second end and a second end region, said first end region being formed adjacent said first end of a corresponding wire segment, said second end region being formed adjacent said second end of a corresponding wire segment; and,
(c) each of said first ends being spaced from a remaining portion of a corresponding wire segment a distance at least equal to said first diameter thereby forming a gap in each of said first end regions having a width at least equal to said first diameter, said first end regions each having a leg member forming a portion of an outermost edge of said conveying surface, said leg member of one of said plurality of wire segments overlaps a first end region of a wire segment interconnected to said one of said plurality of wire segments.

10. A conveyor belt as recited in claim 9, wherein:
(a) each of said second ends being spaced from a remaining portion of a corresponding wire segment a distance at least equal to said first diameter thereby forming a gap in each of said second end regions having a width at least equal to said first diameter, said second end regions each have a leg member forming a portion of an outermost edge of said conveying surface, at least a portion of said leg member of said second end region of one of said plurality of wire segments overlaps a second end region of a wire segment interconnected to said one of said plurality of wire segments.

11. A conveyor belt as recited in claim 9, wherein:
(a) said plurality of wire segments are formed from stainless steel.

12. A conveyor belt as recited in claim 9, wherein:
(a) said leg member of each of said first end regions extends at a first angle downwardly from said conveying surface, said first angle is less than 90 degrees and greater than 0 degrees.

13. A conveyor belt as recited in claim 9, wherein:
(a) said first ends and said second ends of said plurality of wire segments are buffed.

14. A conveyor belt as set forth in claim 9, wherein:
(a) said conveying surface has a plurality of openings formed therein.

15. A conveyor belt as set forth in claim 14, wherein:
(a) said plurality of openings are uniform in size and shape.

16. A conveyor belt, comprising:
(a) a plurality of wire segments, said plurality of wire segments being interconnected to form a conveying surface to convey at least one article from one point to another, said conveying surface having first and second outermost edges;
(b) each of said plurality of wire segments having at least one z-bend forming upper and lower spans, said upper span being offset from said lower span relative to a direction of travel of said conveying surface, each of said plurality of wire segments further having a first diameter, a first end, a first end region, a second end and a second end region, each of said first end regions of said plurality of wire segments being open end regions, each of said first ends being spaced from a remaining portion of a corresponding wire segment a distance at least equal to said first diameter thereby forming a gap in each of said first end regions having a width at least equal to said first diameter, said first open end regions each having an edge member forming a portion of said first outermost edge of said conveying surface, each of said edge members of said first open end regions of said plurality of wire segments being disposed such that said first outermost edge is continuous.

17. A conveyor belt as set forth in claim 16, wherein:
(a) said second open end regions each have an edge member forming a portion of said second outermost edge of said conveying surface, each of said edge members of said second open end regions of said plurality of wire segments is disposed such that said second outermost edge is continuous.

18. A conveyor as set forth in claim 16, wherein:
(a) said first open end regions are substantially U-shaped.

19. A conveyor as set forth in claim 17, wherein:
(a) said second open end regions are substantially U-shaped.

* * * * *